April 12, 1927.

F. L. MORSE 1,624,058

POWER DRIVE CHAIN

Filed March 14, 1925

INVENTOR
Frank L. Morse
BY
Symnestvedt + Lechner
ATTORNEYS

Patented Apr. 12, 1927.

1,624,058

UNITED STATES PATENT OFFICE.

FRANK L. MORSE, OF ITHACA, NEW YORK, ASSIGNOR TO MORSE CHAIN COMPANY, A CORPORATION OF NEW YORK.

POWER DRIVE CHAIN.

Application filed March 14, 1925. Serial No. 15,611.

The object of my present invention is the provision of a power drive chain in which the links are composed of a plurality of plates mounted edgewise upon the pintles in interspersed relation and with tooth engaging portions directed laterally, similar in these respects to the well known Morse rocker joint chain in common use.

The first of the objects of this invention is the provision of a device of the character specified in which in place of the two part rocker joint pintle I provide a round pintle which is held against rotation and cooperates with a single bush held in place by the plates of the links with which it engages and arranged and constructed in such manner that the part of the surface between the pintle and bush which wears bright in action, will be so covered and protected as not to be readily corroded by the action of the acids which are so commonly precipitated in the lubricant employed for example, in automobile work.

A further object of this invention is the provision of a chain of the character specified which, while applicable to any pitch will be peculiarly useful in connection with such small pitches as are much favored in service work, as for example, the well known ⅜″ pitch.

Another object of this invention is the provision of a chain of the character specified in which the pin or pintle will be rigidly held in one of the side plates at one of its ends but have a certain degree of free motion longitudinally of the chain at its other end in the oppositely disposed side plates. This will have the effect of relieving the side plates of excessive strain in pulling action and permit of a certain adjustment of the pintle to the apertures in the intermediate plates so that the latter will take a better distributed share of the strain and there will be less danger of breakage of the side plates.

Another object of this invention is to provide a chain of the character specified in which the bearing surfaces between the pintle and its bush will be efficiently lubricated in service.

The above as well as such other objects as may hereinafter appear, I obtain by means of a construction which I have illustrated in preferred form in the accompanying drawings, wherein—

Fig. 1 is a side view of a portion of chain embodying my invention, part of the figure being shown in section.

Fig. 2 is a plan view, part of it also being shown in section.

Fig. 3 is a side view of one of the side plates in which the cylindrical pin or pintle is secured.

Fig. 4 is one of the intermediate plates with which the bush is held in fixed relation.

Fig. 5 is one of the intermediate plates arranged with apertures to permit oscillatory motion of the bush around the pin sufficient to allow the necessary flexure in the chain.

Fig. 6 is a sectional view showing the relative position of the bush and the pin at one extreme of its movement in bending.

Fig. 7 shows a middle position of the bush that is with the chain running straight as indicated in Fig. 1.

Fig. 8 is another position of the bush and pin showing the opposite flexure from Fig. 6 and Fig. 9 shows a modified form of bush and pin in which the oil or lubricating grooves are formed in the bush instead of the external surface of the pin.

Referring now more particularly to Figs. 1 and 2 it will be seen that I have therein shown a portion of chain comprising a couple of pin holding links 1 composed of side plates 1ª and intermediate plates 1ᵇ and a couple of bush holding links 2 composed of a series of plates such as are marked 2ª in Fig. 4. In my preferred construction the bush holding plates are all alike, that is as shown in Fig. 4 and the bushings 2ᵇ extend only to the inside surface of the side plates 1ª which are secured to the cylindrical pin.

The pins 3 except at their ends, are cylindrical in form and provided with lubrication or oil grooves 4 the ends of the pin being flat as shown at 5 to engage the elongated recesses 6 and 7 shown in Fig. 3 the end which fits in the recess 7 being rigidly riveted in place as indicated at 8 while the end which fits in the recess 6 has a slight free motion longitudinally of the chain as indicated at 9 in Fig. 2.

It will be seen that by this arrangement each cylindrical pin will be firmly anchored at one end in one of the side plates 1ª and at the other end will pass through the slightly elongated aperture 6 of the other side plate on the opposite side of the chain and be riveted over as indicated at 10 to keep the chain from coming apart. The slight motion in the clearances 9 will permit the intermediate plates to take a firm bearing upon the pin so that the strain between the pin 3 and bush 2ᵇ will be better equalized between the different plates and excessive pulling strain on the side plates will be eliminated, which will do away with much trouble that has been encountered in chains of this character from breakage of side plates in which, when the pins are rigidly held at both ends, any variation in pitch dimension or the dimension of the apertures in the plates as between the side plates and the intermediate plates, even although such variation be very small, will present ununiform distribution of stress. Slight variations in dimension are almost unavoidable where the plates are made by punching.

Referring now more particularly to Figs. 6, 7 and 8 it will be seen that I have arranged the oil or lubrication grooves 4 opposite to each other in the surface of the pin 3 and have constructed the bushes 2ᵇ of substantially semi-cylindrical size, that is, extending one half the way around the pin and at each of the inner edges of the bushes I have cut away or chamfered the parts as shown at 11 which, as shown at 12 and 13, will wipe over the grooves to aid the lubrication of the inner surface of the bush and at the same time prevent interference in the movement between the bush and pin and with the oil grooves full of grease or oil will assist materially in protecting the wearing surfaces which take the strain from contact with acid which may be in the lubricant or in the case in which the chain is running. The provision of the clearance at 11 also avoids brightening the surface on the other side of the oil groove and hence leaves it less subject to attack by acid where it is more exposed.

I have shaded the wearing face on the pin in each of the Figs. 6, 7 and 8 more heavily to make this action clear.

The contacting portion of the plates of the links are indicated at 15 and are made in the usual manner for contact with the teeth on the cooperating gear.

I claim:—

1. A chain comprising in combination, a series of links composed of plates, a joint for said links comprising a cylindrical pin and a bush, the pin being non-rotative in the link in which it is secured one end of each pin being anchored in one side plate and provided with room to move longitudinally of the chain in the opposite side plate.

2. A chain comprising in combination, a series of links composed of plates, a joint for said links comprising a cylindrical pin and a bush, the pin being non-rotative in the link in which it is secured, lubrication grooves in said pin, the bush being arranged to overhang the lubrication grooves.

3. A chain comprising in combination, a series of links composed of plates, a joint for said links comprising a cylindrical pin and a bush, the pin being non-rotative in the link in which it is secured, lubrication grooves in said pin, the bush being arranged to overhang the lubrication grooves and provided with clearance at its inner side edges.

4. A chain comprising in combination a series of links composed of plates, a joint for said links comprising a cylindrical pin and a semi-circular bush, the pin being non-rotative in the link in which it is secured, and the bush being provided with clearance at its inner side edges and being arranged to materially overhang that portion of the pin which wears bright in operation.

In testimony whereof, I have hereunto signed my name.

FRANK L. MORSE.